US008542407B2

(12) United States Patent
Chiba

(10) Patent No.: US 8,542,407 B2
(45) Date of Patent: Sep. 24, 2013

(54) IMAGE PROCESSING APPARATUS AND METHOD DETERMINES ATTRIBUTES OF IMAGE BLOCKS BASED ON PIXEL EDGE INTENSITIES RELATIVE TO NORMALIZED AND FIXED THRESHOLDS

(75) Inventor: Tetsuroh Chiba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 415 days.

(21) Appl. No.: 12/892,648

(22) Filed: Sep. 28, 2010

(65) Prior Publication Data

US 2011/0075220 A1 Mar. 31, 2011

(30) Foreign Application Priority Data

Sep. 29, 2009 (JP) .................................. 2009-225342

(51) Int. Cl.
*H04N 1/00* (2006.01)
*H04N 1/387* (2006.01)
*G06K 15/02* (2006.01)
*G06F 3/12* (2006.01)

(52) U.S. Cl.
CPC ....... *H04N 1/00331* (2013.01); *H04N 1/00411* (2013.01); *H04N 1/00413* (2013.01); *H04N 1/0044* (2013.01); *G06K 15/1822* (2013.01); *G06K 15/1882* (2013.01); *G06F 3/1203* (2013.01); *G06F 3/1242* (2013.01)
USPC ........... 358/2.1; 358/1.18; 358/538; 358/453; 358/462

(58) Field of Classification Search
USPC ................ 358/1.9, 2.1, 3.24, 1.15, 1.18, 527, 358/538, 448, 450, 453, 462, 464; 382/164, 382/173, 176, 177, 282, 286–301, 309
See application file for complete search history.

(56) References Cited

U.S. PATENT DOCUMENTS

| 6,766,065 | B1 * | 7/2004 | Yamamoto | 382/282 |
|---|---|---|---|---|
| 6,834,127 | B1 * | 12/2004 | Yamamoto | 382/282 |
| 7,126,612 | B2 | 10/2006 | Sekiguchi et al. | |
| 7,327,900 | B2 * | 2/2008 | Harada et al. | 382/289 |
| 8,417,057 | B2 * | 4/2013 | Oh et al. | 382/177 |
| 2007/0019259 | A1 | 1/2007 | Lee | |
| 2007/0086667 | A1 * | 4/2007 | Dai et al. | 382/173 |
| 2007/0253680 | A1 | 11/2007 | Mizote et al. | |
| 2008/0309970 | A1 | 12/2008 | Kobayashi | |
| 2009/0009820 | A1 * | 1/2009 | Fukui | 358/450 |
| 2009/0086241 | A1 | 4/2009 | Ito | |

FOREIGN PATENT DOCUMENTS

| CN | 1901601 A | 1/2007 |
|---|---|---|
| CN | 101329731 A | 12/2008 |
| CN | 101398660 A | 4/2009 |
| JP | 7-200734 A | 8/1995 |

(Continued)

*Primary Examiner* — Scott A Rogers
(74) *Attorney, Agent, or Firm* — Birch, Stewart, Kolasch & Birch, LLP

(57) ABSTRACT

The digital complex machine is constructed to split data corresponding to an image read by the image reading unit and output a split image separately from a read image. A split image is extracted by the partial image extracting unit on the basis of area designation by the user through the display-operation input unit or on the basis of an extraction result of feature information by the character recognizing unit or attribute information of a highlighted character. Data corresponding to a partial image is then generated by the print image generating unit and a partial image is printed on a sheet different from a read image by the print control unit. Otherwise, electronic data corresponding to a partial image is transmitted to another digital complex machine, a PC, a mobile phone, a server, a USB memory and the like.

12 Claims, 14 Drawing Sheets

(56) References Cited

FOREIGN PATENT DOCUMENTS

| | | |
|---|---|---|
| JP | 2002-298122 A | 10/2002 |
| JP | 2003-259108 A | 9/2003 |
| JP | 2005-107691 A | 4/2005 |
| JP | 2007-81970 A | 3/2007 |
| JP | 2007-316613 A | 12/2007 |
| JP | 2008-258823 A | 10/2008 |

* cited by examiner

F I G. 1
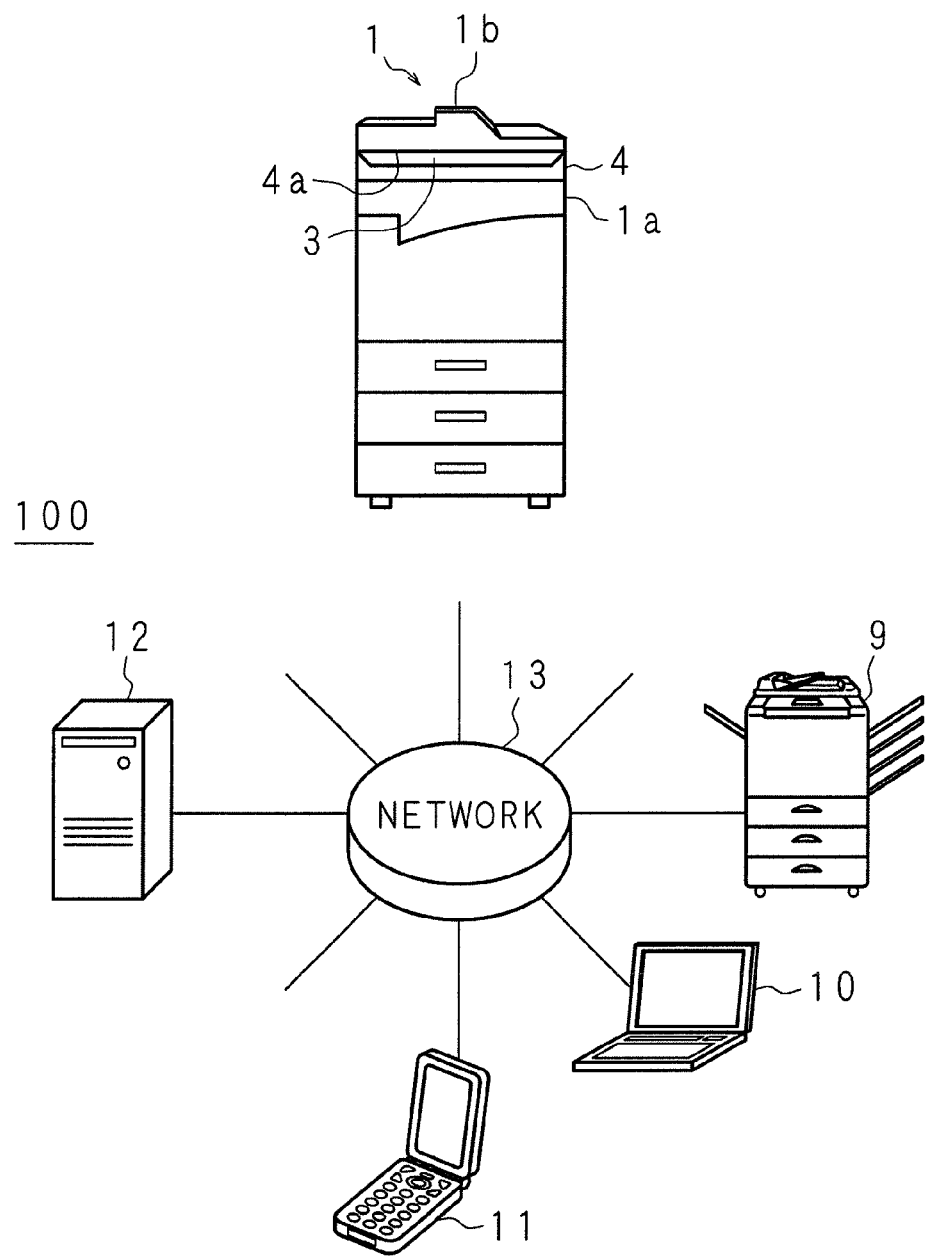

FIG. 8

```
DATE   MONTH XX DAY XX  (Sat.)
       FROM 7p.m.
VENUE  XX HALL
       (3 MINUTES AFTER
        XX STATION ALIGHTING)
CONTACT INFORMATION
       XXX-XXXX-XXX
```

F I G. 9
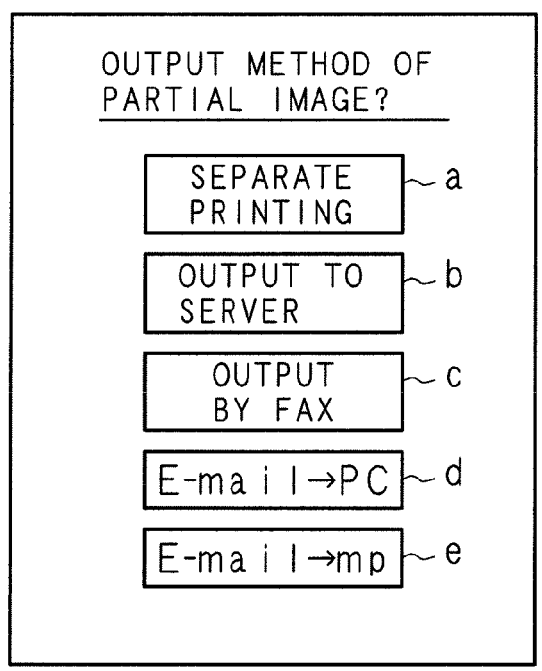

IMAGE PROCESSING APPARATUS AND METHOD DETERMINES ATTRIBUTES OF IMAGE BLOCKS BASED ON PIXEL EDGE INTENSITIES RELATIVE TO NORMALIZED AND FIXED THRESHOLDS

CROSS-REFERENCE TO RELATED APPLICATIONS

This Nonprovisional application claims priority under 35 U.S.C. §119(a) on Patent Application No. 2009-225342 filed in Japan on Sep. 29, 2009, the entire contents of which are hereby incorporated by reference.

BACKGROUND OF THE INVENTION

1. Field of the Invention

The present invention relates to an image processing device and an image processing method for outputting data corresponding to a partial image of a read image.

2. Description of Related Art

A complex machine is provided with functions such as copying, printing, image scan, facsimile, electronic data store and electronic data transmission by electronic mail (e-mail). In the case of copying, for example, it is required to reproduce the same content as an original document with image quality as close as possible to the original document.

However, for some documents, it is preferable not only to simply reproduce the same content but also to split and output information included in the document, that is, to print images corresponding to the respective information on different sheets or to transmit a part of information to an external device or the like as electronic data and store the electronic data therein, so that necessary information can be managed and handled easily.

Japanese Patent Application Laid-Open No. 2008-258823 includes disclosure of an invention of an image processing device, which sets information indicative of output permit or output inhibit for each of output methods of display, printing and transmission for a predetermined area of image data so as to prevent leakage of the predetermined area that is highly confidential.

SUMMARY OF THE INVENTION

However, an image processing device in the Japanese Patent Application Laid-Open No. 2008-258823 is constructed only to prevent leakage of a predetermined area by limiting output as described above and not to improve convenience by splitting and separately outputting an image.

The present invention has been made in view of such a situation and the object thereof is to provide a convenient image processing device and a convenient image processing method, which can protect information, enable use of the information some other time and reduce the communications traffic by: splitting a necessary part, a part that will be necessary later, an important part or the like from a read image; and printing an obtained partial image or outputting data corresponding to a partial image to an external device.

An image processing device according to the present invention, which processes a read image and outputs data based on the read and processed image by one of output methods including printing and transmission to an external device under control of a control unit, comprises a partial image extracting unit for extracting data corresponding to a partial image of said read image, wherein said control unit outputs the data extracted by said partial image extracting unit by any one of the output methods.

Regarding the present invention, in the case of copying of a document such as a workbook or a quiz, for example, including a problem and an answer on the same page, the problem and the answer are read at a time and then printed separately, or the problem is printed and only the answer is outputted as electronic data, so that the document is split purposely on the basis of an area designated by the user and outputted. Accordingly, information, which will be necessary later, can be stored at a hardly-visible place such as a mobile phone, for example, and satisfactory convenience can be achieved.

Moreover, by transmitting only an important part (such as description of a date or a map part indicative of a venue) of a guide such as a circular letter or an event announcement, for example, to a mobile phone or the like as a partial image by e-mail, the user can obtain and check the important part at the mobile phone or the like even if he loses the important part in the field.

In addition, in the case of facsimile of a product order sheet or the like, it is also possible to reduce the communications traffic by specifying only an order content part of the order sheet as a partial image to reduce the data volume and then transmitting only the order content part.

An image processing device according to the present invention further comprises an operation input unit for accepting selection of an output method of the data corresponding to said partial image.

Regarding the present invention, a partial image can be outputted by an output method desired by the user and convenience can be further improved.

An image processing device according to the present invention is characterized in that said control unit causes printing based on data corresponding to a rest image of said read image.

Regarding the present invention, when a read document includes confidential information such as personal information, the information can be kept secret by printing the document after deleting the confidential information, and confidential information can be protected even if a print sheet, on which the rest image of a read image is printed, is distributed to the general public by mistake, by outputting electronic data corresponding to a deleted part and distributing the electronic data only to a specified person, or by passwording the electronic data and storing the electronic data to give access permit only to a specified person.

An image processing device according to the present invention is characterized in that said operation input unit accepts an instruction for printing a plurality of copies of said partial image on one print sheet on the basis of the data corresponding to said partial image; and said control unit causes printing of a plurality of copies of said partial image on the print sheet when accepting said instruction by said operation input unit.

Regarding the present invention, for a document such as an application form, for example, a part of which is to be cut out before being submitted, a plurality of application forms can be prepared at a time by outputting a plurality of copies of only a space part to fill out onto one sheet.

An image processing device according to the present invention is characterized in that said operation input unit accepts designation of an area; and said partial image extracting unit extracts said partial image on the basis of the accepted area.

Regarding the present invention, a partial image is extracted on the basis of an area, which is designated by the user through an operation input unit of the image processing device, and therefore a partial image can be extracted easily and reliably.

An image processing device according to the present invention is characterized in that said operation input unit accepts designation of attribute information including a character size, a character color or a character style; a character recognizing unit for extracting the designated attribute information on the basis of a character pattern cut out from said read image and giving said attribute information to said partial image extracting unit is provided; and said partial image extracting unit extracts a partial image including a character having said attribute information given from said character recognizing unit.

Regarding the present invention, a part of an image including a highlighted character having the attribute information can be extracted automatically so as to set a partial image.

An image processing device according to the present invention is characterized in that said operation input unit accepts designation of a character string; a character recognizing unit for extracting feature information for character recognition on the basis of a character pattern cut out from said read image, converting said feature information into a character code and giving the character code to said partial image extracting unit is provided; and said partial image extracting unit extracts a partial image of a part where character codes corresponding to the character string line up, on the basis of said character code given from said character recognizing unit.

Regarding the present invention, a part of an image including the character string can be extracted automatically so as to set a partial image.

An image processing method according to the present invention, for processing a read image and outputting data based on the read and processed image by one of output methods including printing and transmission to an external device, comprises: a first step of extracting data corresponding to a partial image of said read image; and a second step of outputting said data extracted in the first step by any one of the output methods.

Regarding the present invention, information, which is to be necessary later, of information included in a read image can be stored at a hardly-visible place such as a mobile phone, for example, and satisfactory convenience can be achieved.

Moreover, the user can obtain and check an important part of a read image at a mobile phone or the like even if he loses the important part, by preliminarily transmitting only the important part to the mobile phone or the like as a partial image by e-mail.

In addition, it is possible to reduce the communications traffic by transmitting only a necessary part of a read image as a partial image.

With the present invention wherein a necessary part, a part, which is to be necessary later, an important part or the like of a read image is split and printed or outputted to an external device, satisfactory convenience can be achieved since information can be protected, the information can be used some other time and the communications traffic can be reduced.

The above and further objects and features will more fully be apparent from the following detailed description with accompanying drawings.

BRIEF DESCRIPTION OF THE DRAWINGS

FIG. 1 is a view for illustrating the structure of an image processing system provided with a digital complex machine as an image processing device according to an embodiment of the present invention;

FIG. 8 is a view for illustrating a screen to check whether characters having a designated size have been extracted or not;

FIG. 9 is a view for illustrating a screen to select an output method of a partial image;

DETAILED DESCRIPTION OF THE INVENTION

Figure 2:
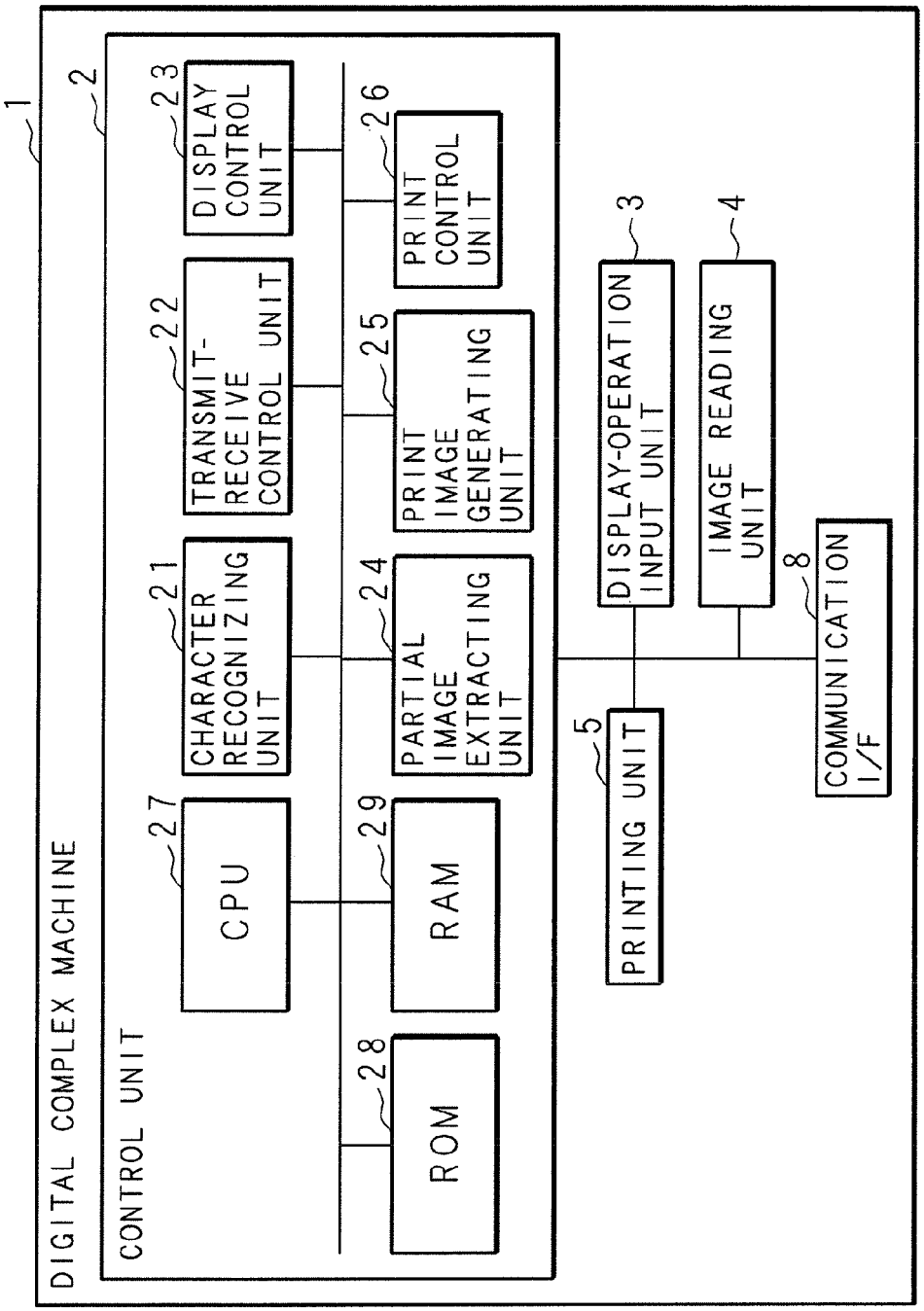
FIG. 2 is a block diagram for schematically illustrating the structure of the digital complex machine according to the embodiment of the present invention.

The following description will explain the present invention in concrete terms with reference to the drawings illustrating an embodiment thereof.

FIG. 1 is a view for illustrating the structure of an image processing system 100 provided with a digital complex machine 1 as an image processing device according to an embodiment of the present invention. The digital complex machine 1 is connected with: another digital complex machine 9; a personal computer (which will be hereinafter referred to as a PC) 10; a mobile phone 11; and a server 12, through a network 13.

The digital complex machine 1 is provided with: a main body 1a, which includes an image reading unit (color scanner) 4 having a document stage 4a made of transparent glass at an upper part; and an automatic document processing unit 1b, which feeds a document on the document stage 4a, provided above the image reading unit 4. A display-operation input unit 3 for accepting an operation by the user is disposed at the front side of the document stage 4a. The automatic document processing unit 1b is made rotatable so that the user can lay a document manually after opening the upper side of the document stage 4a. The digital complex machine 1 is constructed to transmit image data to the digital complex machine 9, the PC 10, the mobile phone 11 and the server 12 through a communication I/F 8, which will be described later, provided in the main body 1a.

FIG. 2 is a block diagram for schematically illustrating the structure of the digital complex machine 1.

The digital complex machine 1 is provided with: a control unit 2; a printing unit 5; and the display-operation input unit 3, the image reading unit 4 and the communication I/F unit 8 described above.

In the control unit 2, a CPU (Central Processing Unit) 27 is connected with: a character recognizing unit 21; a transmit-receive control unit 22; a display control unit 23; a partial image extracting unit 24; a print image generating unit 25; a print control unit 26; a ROM 28; and a RAM 29, through a bus, and the CPU 27 controls the operation of the entire digital complex machine 1 according to a control program prestored in the ROM 28 so that the respective units in the digital complex machine 1 operate in a coordinated manner. The character recognizing unit 21, the transmit-receive control unit 22, the display control unit 23, the partial image extracting unit 24, the print image generating unit 25 and the print control unit 26 may be constructed from hardware logic or may be embodied by software using the CPU 27.

The character recognizing unit 21 extracts designated attribute information and feature information for character recognition from a cut-out character pattern, converts the feature information into a character code, adds a code of detected attribute information to the character code and gives the character code to the partial image extracting unit 24. A concrete example of the structure of the character recognizing unit 21 is an optical character reader (OCR) disclosed in Japanese Patent Application Laid-Open No. H7-200734.

The transmit-receive control unit 22 controls transmission of a partial image to the PC 10, the mobile phone 11, the server 12 and the like through the network 13. The display control unit 23 controls display by the display-operation input unit 3. The partial image extracting unit 24 extracts an area, which is designated by the user through the display-operation input unit 3, from a read image as a partial image or extracts a partial image on the basis of a code of attribute information given from the character recognizing unit 21 or on the basis of the character code. The print image generating unit 25 processes image data (RGB data) of a document read by the image reading unit 4 to image data for printing. In addition, in the present embodiment, the print image generating unit 25 generates data corresponding to a print image obtained by removing a partial image from a read image or generates data corresponding to a print image to make a plurality of copies of an area image and print the copies on one sheet. The print control unit 26 controls printing by the printing unit 5.

The image reading unit 4 is provided with: an optical system such as a light source for irradiating a document laid on the document stage 4a; and a CCD (Charge Coupled Devices) line sensor having a plurality of photoelectric conversion elements (CCDs), which are disposed in the horizontal scanning direction, for converting light reflected from the document into an electric signal having the respective color components of R (red), G (green) and B (blue) (both elements are not illustrated in the figures). The image reading unit 4 irradiates a document which is laid at a predetermined position on the document stage 4a, with light from the optical system in response to an instruction to start reading, which is inputted from the display-operation input unit 3, and forms an image on the CCD line sensor with light reflected from the document while moving the optical system in a vertical scanning direction, which crosses the horizontal scanning direction at a right angle in the horizontal plane, to convert the reflected light into an electric signal.

The image reading unit 4 further corrects characteristics, such as the light distribution characteristic of the light source used for reading the document and the sensitivity unevenness of the CCD line sensor, of an electric signal outputted from the CCD line sensor and gives the corrected electric signal to the control unit 2 as image data. Such image data can be given to the digital complex machine 9, the PC 10 and the mobile phone 11 through the network 13.

The image data outputted from the image reading unit 4 is composed of a plurality of pixels and each pixel has 256 gradation levels for each of RGB colors, so that so-called full color having 16777216 colors can be expressed. Moreover, the optical resolution of the image reading unit 4 in the horizontal scanning direction and the vertical scanning direction is 600 DPI (Dot Per Inch).

The printing unit 5 is provided with: a photoconductor drum; a laser writer for forming an electrostatic latent image on the photoconductor drum; a developer for developing the formed electrostatic latent image and forming a toner image on the photoconductor drum; and a transfer unit for transferring the formed toner image to a sheet (all elements are not illustrated in the figures), and forms an output image on a sheet on the basis of image data given from the print image generating unit 25 by so-called electrophotography method.

It is to be noted that the printing unit 5 may be constructed to form an image not by electrophotography method but by another method such as ink jet, heat transfer or sublimation.

The following description will explain an image processing method according to the embodiment of the present invention.

Figure 3:
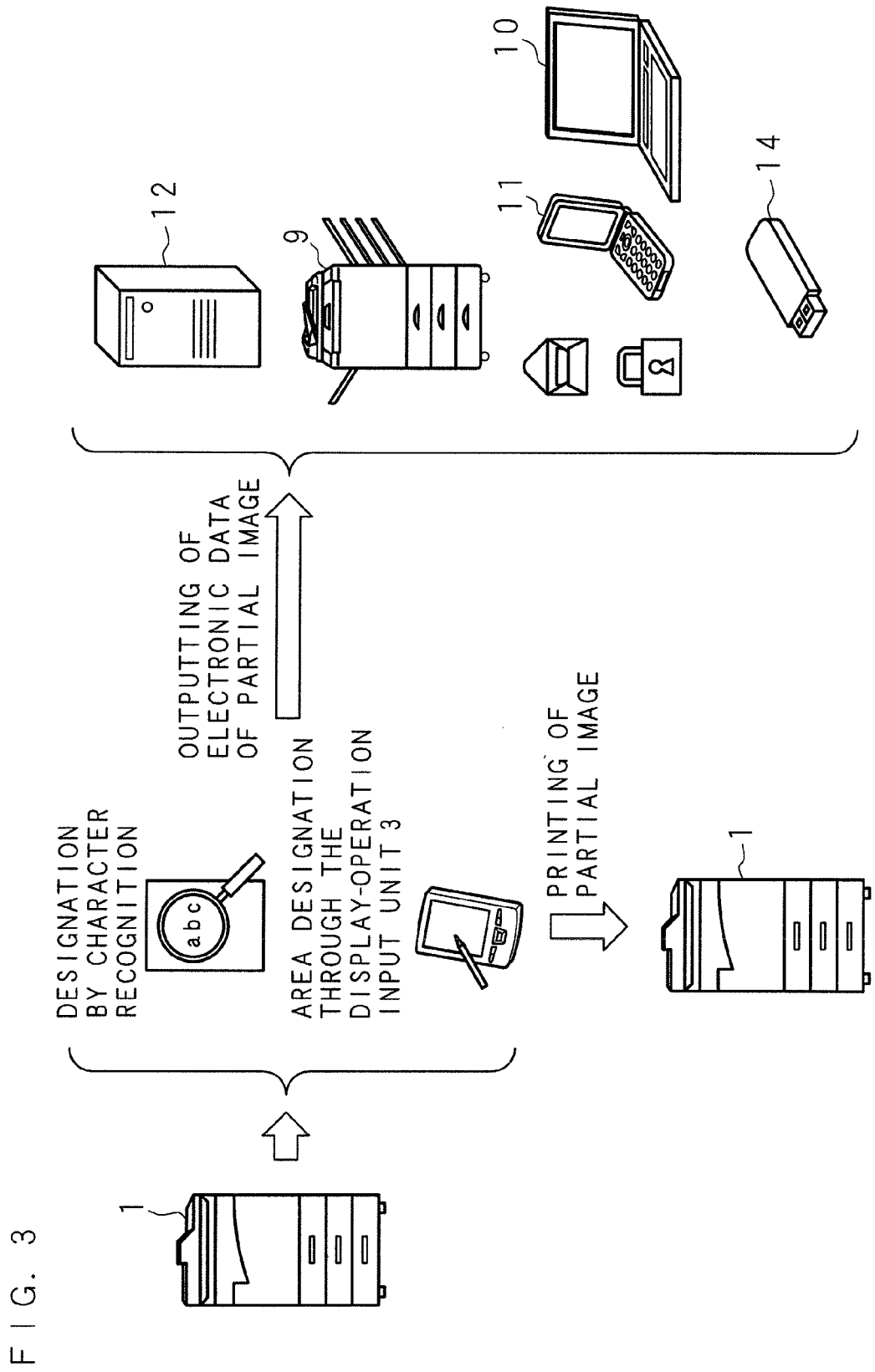
FIG. 3 is a view for explaining an image processing method according to the embodiment of the present invention.

FIG. 3 is a view for explaining the image processing method according to the embodiment of the present invention.

The digital complex machine 1 of the present embodiment is constructed not to output data corresponding to an image read by the image reading unit 4 in one form without modification but to allow the user to select whether image data is to be split and outputted physically separately or not. A split image is extracted by the partial image extracting unit 24 on the basis of area designation by the user through the display-operation input unit 3 or on the basis of an extraction result of feature information by the character recognizing unit 21 or attribute information of a highlighted character. In addition, data corresponding to a partial image is generated by the print image generating unit 25 and a partial image is printed on a sheet different from a read image by the print control unit 26. Otherwise electronic data of a partial image is outputted to an external device by the transmit-receive control unit 22. Examples of an output method to an external device are: facsimile to the digital complex machine 9; transmission to the PC 10 and the mobile phone 11 by e-mail; transmission to the server 12; and transmission to a USB memory 14. Furthermore, information included in a partial image can be protected by passwording the electronic data.

Figure 4:
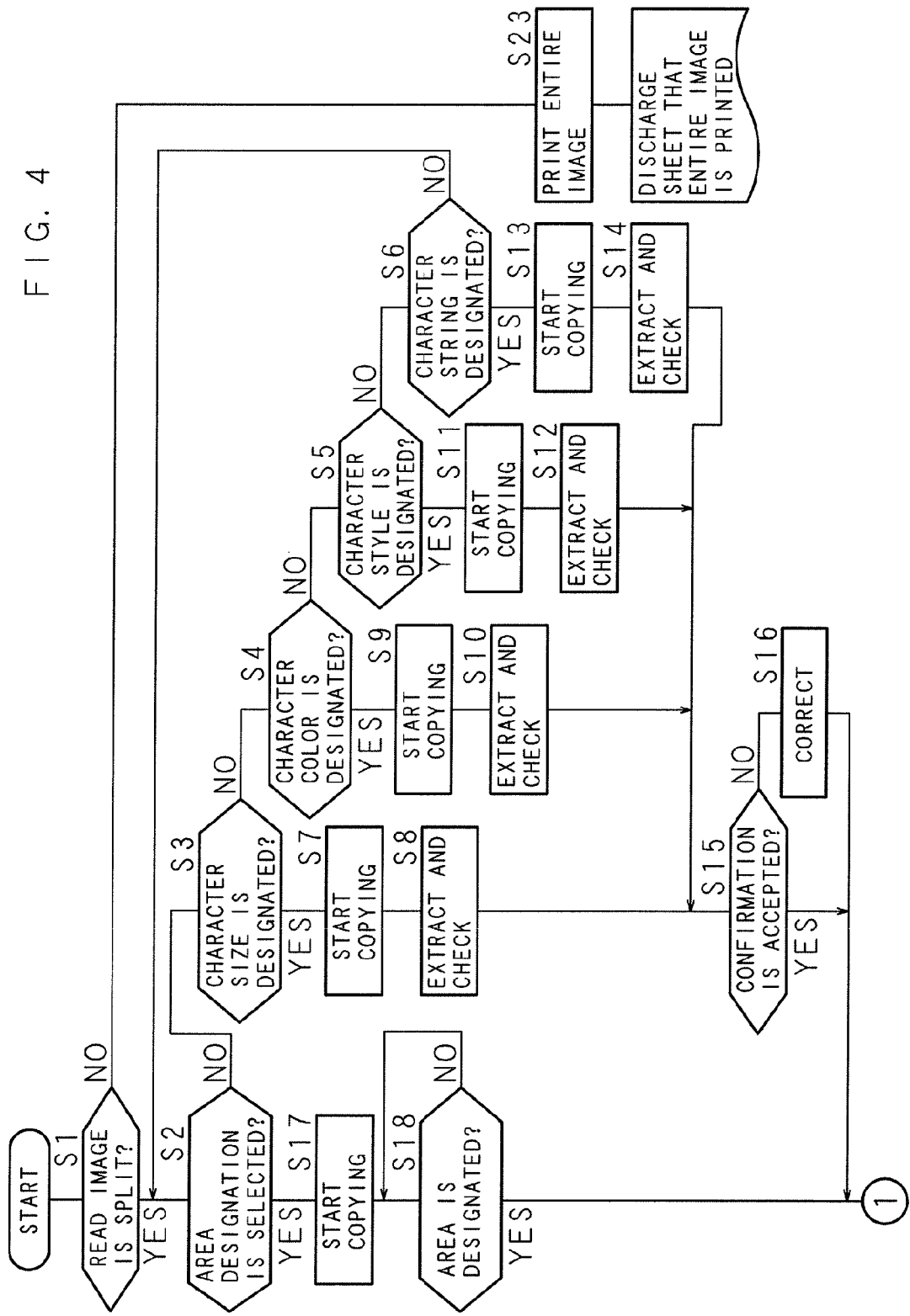
FIG. 4 is a flow chart for illustrating the process procedures for a read image by a CPU of a control unit according to the embodiment of the present invention.
Figure 5:
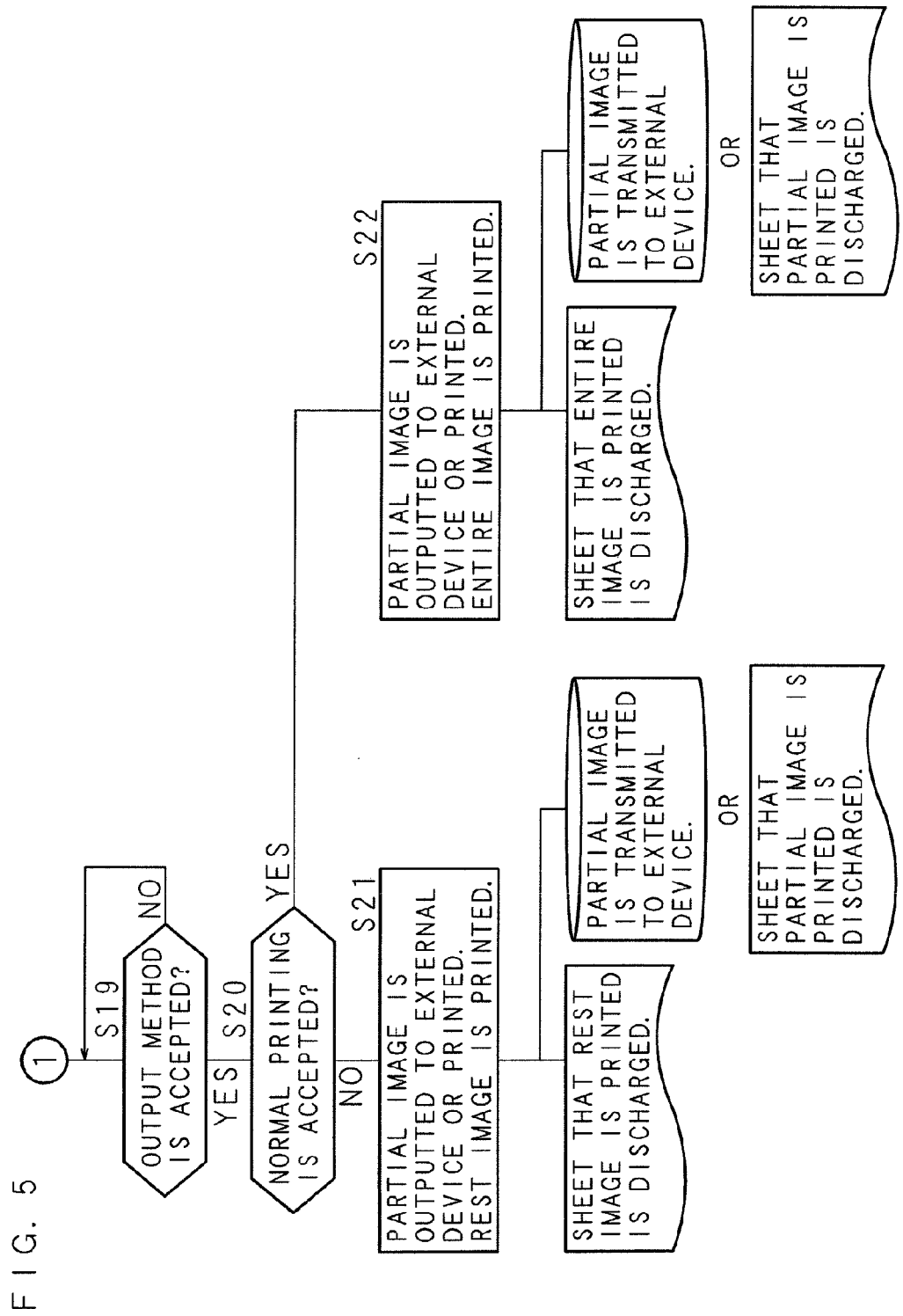
FIG. 5 is a flow chart for illustrating the process procedures for a read image by the CPU of the control unit according to the embodiment of the present invention.

FIGS. 4 and 5 are a flow chart for illustrating the process procedures for a read image by the CPU 27 of the control unit 2. The process is activated when reading of an image becomes possible, and the CPU 27 reads out a control program (image processing program) prestored in the ROM 28 and executes image processing according to the image processing program.

Figure 6:
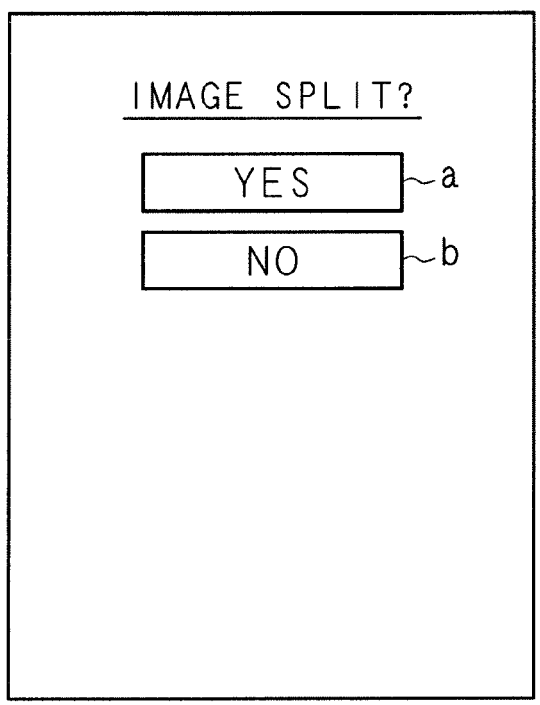
FIG. 6 is a view for illustrating a screen to ask whether an image is to be split and outputted or not.

When image processing is activated, the CPU 27 first displays a screen to ask the user whether a read image is to be split and outputted or not at the display-operation input unit 3 and judges whether an instruction for output split (image split) has been accepted or not (S1). FIG. 6 is a view for illustrating a screen to ask whether an image is to be split and outputted or not. When it is judged that a "NO" button "b" on the screen has been pressed and an instruction for image split has not been accepted (S1: NO), the entire image is printed by the printing unit 5 (S23) and a sheet, on which the entire image is printed, is discharged from the digital complex machine 1.

Figure 7:
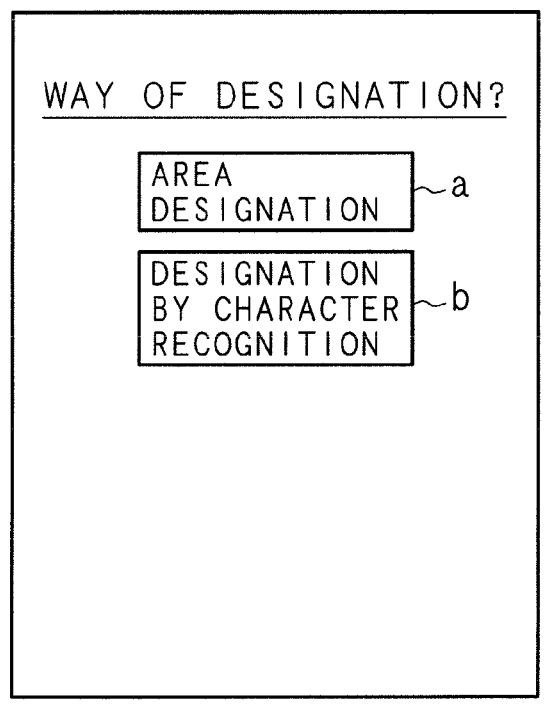
FIG. 7 is a view for illustrating a screen to ask which designation of area designation and designation by character recognition is to be selected.

When judging that an "YES" button "a" on the screen has been pressed and an instruction for image split has been accepted (S1: YES), the CPU 27 displays a screen to ask the user which designation of area designation and designation by character recognition is to be selected at the display-operation input unit 3 and judges whether an instruction for split by area designation has been accepted or not (S2). FIG. 7 is a view for illustrating a screen to ask which designation of area designation and designation by character recognition is to be selected. When judging that a "character recognition designation" button "b" has been pressed and an instruction for split by area designation has not been accepted (S2: NO), the CPU 27 judges whether designation of a character size by the user through the display-operation input unit 3 has been accepted as attribute information for designation by character recognition or not (S3). An example of designation of a character size is "15 p or larger".

When judging that designation of a character size has not been accepted (S3: NO), the CPU 27 judges whether designation of a character color by the user through the display-operation input unit 3 has been accepted or not (S4). An example of designation of a character color is "red" or "blue".

When judging that designation of a character color has not been accepted (S4: NO), the CPU 27 judges whether designation of a character style by the user through the display-operation input unit 3 has been accepted or not (S5). An example of a character style is a "bold character style (font)".

When judging that designation of a character style has not been accepted (S5: NO), the CPU 27 judges whether designation of a character string by the user through the display-operation input unit 3 has been accepted or not (S6). An example of a character string is a keyword of a partial image etc. When judging that designation of a character string has not been accepted (Se: NO), the CPU 27 returns the process to the step S2.

When judging in the step S3 that designation of a character size has been accepted (S3: YES), the CPU 27 causes the image reading unit 4 to start copying (S7).

The CPU 27 then cuts out a character pattern from a read image, and causes the character recognizing unit 21 to detect vertical projection and horizontal projection for the character pattern and to detect the width and the height (size information) of a character from the detection result as the number of points. The character recognizing unit 21 extracts feature information for character recognition from the character pattern, converts the feature information into a character code, adds the number of points to the character code as a size code and gives the character code to the partial image extracting unit 24. When two or more characters having a designated size code continue, for example, the partial image extracting unit 24 judges that the characters are highlighted characters for extracting a partial image and extracts an image including the highlighted characters as a partial image. The CPU 27 then causes the display control unit 23 to display a screen to check whether characters having the designated size have been extracted (a split image has been designated correctly) or not and whether characters have been recognized correctly (characters are correct) or not at the display-operation input unit 3 as a print preview (S8) and advances the process to the step S15. FIG. 8 is a view for illustrating a screen to check whether characters having the designated size have been extracted or not. Illustrated in the figure is a partial image (part "b") including description of important facts such as a date, a venue and contact information, which have been extracted from a document "a" of an event announcement in FIG. 11 that will be described later. Here, the user can check whether characters have been extracted correctly or not and whether characters have been recognized correctly or not by comparing the partial image with the document.

When it is judged in the step S4 that designation of a character color has been accepted (S4: YES), copying is started (S9). The CPU 27 then cuts out a character pattern from a read image, and causes the character recognizing unit 21 to detect a designated character color, to extract feature information for character recognition from the character pattern, to convert the feature information into a character code, to add the detected character color to the character code as a color code and to give the character code to the partial image extracting unit 24. When two or more characters having the designated color code continue, for example, the partial image extracting unit 24 judges that the characters are highlighted characters for executing a partial image and extracts an image including the highlighted characters as the partial image. The CPU 27 then causes the display control unit 23 to display a screen to check whether characters having the designated color have been extracted or not and whether characters have been recognized correctly or not at the display-operation input unit 3 as a print preview (S10) and advances the process to the step S15. Here, the user can check whether characters having the designated color have been extracted correctly or not and whether characters have been recognized correctly or not by comparing the partial image with the document.

When it is judged in the step S5 that designation of a character style has been accepted (S5: YES), copying is started (S11). The CPU 27 then cuts out a character pattern from a read image, and causes the character recognizing unit 21 to detect feature information of a character line corresponding to the designated character style, to extract feature information for character recognition from the character pattern, to convert the feature information into a character code, to add the feature information of the detected character line to a corresponding character code as a character style code and to give the character code to the partial image extracting unit 24. When two or more characters having the designated character style continue, for example, the partial image extracting unit 24 judges that the characters are highlighted characters for extracting a partial image and extracts an image including the highlighted characters as the partial image. The CPU 27 then causes the display control unit 23 to display a screen to check whether characters having the designated character style have been extracted or not and whether characters have been recognized correctly or not as a print preview (S12) and advances the process to the step S15. Here, the user can check whether characters having the designated character style have been extracted correctly or not and whether characters have been recognized correctly or not by comparing the partial image with the document.

When it is judged in the step S6 that designation of a character string has been accepted (S6: YES), copying is started (S13). The CPU 27 cuts out a character pattern from a read image, and causes the character recognizing unit 21 to extract feature information for character recognition from the character pattern, to convert the feature information into a character code and to give the character code to the partial image extracting unit 24. The partial image extracting unit 24 extracts a part image including character codes corresponding to the designated character string, and extracts an image including the part as a partial image. The CPU 27 then causes the display control unit 23 to display a screen to check whether a partial image having the designated character string has been extracted or not at the display-operation input unit 3 as a print preview (S14) and advances the process to the step S15. Here, the user can check whether the partial image including the designated character string has been extracted correctly or not by comparing the partial image with the document.

In the step S15, whether confirmation that a partial image including characters having the designated attribute information or a partial image including the designated character string has been extracted and characters have been recognized correctly by the user through the display-operation input unit 3 has been accepted or not is judged. For example, which button of "YES" and "NO" displayed at the display-operation input unit 3 has been pressed is judged, though such a manner is omitted in the figures. When judging that the confirmation has not been accepted (S15: NO), that is, when judging that processing has not been executed correctly, the CPU 27 corrects the partial image by: accepting a character, which has not been extracted correctly and is to be added, and a part which is to be added, according to area designation by the user using the display-operation input unit 3 and adding the character and the part to the partial image; and accepting a part which has been extracted incorrectly as a partial image, deleting the part, and correcting (S16). The CPU 27 then advances the process to the step S19. When judging that the confirmation has been accepted (S15: YES), the CPU 27 also advances the process to the step S19.

When judging in the step S2 that an "area designation" button "a" has been pressed and an instruction for split by area designation has been accepted (S2: YES), the CPU 27 causes the image reading unit 4 to start copying (S17).

The CPU 27 then judges whether designation of an area corresponding to a partial image using a rectangle (a frame border) by the user through the display-operation input unit 3 has been accepted or not (S18). When it is judged that area designation has not been accepted (S18: NO), judging is repeated.

When judging that the area designation has been accepted (S18: YES), the CPU 27 displays a screen to select an output method of the partial image and judges whether selection of an output method has been accepted or not (S19). FIG. 9 is a view for illustrating a screen to select an output method of a partial image. There are: a method of (a) separate printing on a sheet different from the read image or the rest image; and a method of output of electronic data of a partial image to another external device, the destinations of electronic data including (b) output to the server 12, (c) output by facsimile to another digital complex machine 9, (d) output to the PC 10 by e-mail and (e) output to the mobile phone (mp) 11 by e-mail. When it is judged that selection of an output method has not been accepted (S19: NO), the judging is repeated.

When electronic data output is selected, whether the electronic data is to be passworded or not is asked on a screen and, when the electronic data is to be passworded, passwording is designated here. Moreover, when the partial image is to be printed on a different sheet, whether the designated partial image is to be outputted repeatedly or not is asked and, when the partial image is to be outputted repeatedly, the number of repetitions is accepted.

When judging in the step S19 that selection of an output method has been accepted (S19: YES), the CPU 27 causes the display control unit 23 to display a screen to ask whether normal printing to print the entire read image is to be executed or printing excluding a partial image is to be executed at the display-operation input unit 3 and judges whether an instruction for the normal printing has been accepted or not (S20).

When it is judged that the instruction has been accepted (S20: YES), the entire read image is printed, and the partial image is outputted to an external device or printed on a sheet different from the entire image according to the output method selected in the step S19 (S22). That is, a sheet, on which the entire image is printed, is discharged from the digital complex machine 1, and data corresponding to the partial image is outputted to the external device such as a designated digital complex machine 9 or the partial image is printed on a sheet different from the sheet of the entire image and discharged from the digital complex machine 1. Here, when repeated printing is selected, a designated number of copies of the partial image are printed on one sheet.

When judging that the instruction has not been accepted (S20: NO), the CPU 27 causes to print the rest image obtained by removing the partial image from the read image, and to output the partial image to the external device or to print the partial image on a sheet different from the rest image according to the output method selected in the step S19 (S21). That is, a sheet, on which the rest image is printed, is discharged from the digital complex machine 1, and data corresponding to the partial image is outputted to an external device such as a designated digital complex machine 9 or the partial image is printed on a sheet different from the sheet of the rest image and discharged from the digital complex machine 1. Here, when repeated printing is selected, a designated number of copies of the partial image are printed on one sheet.

The following description will explain concrete examples.

Example 1

Figure 10:
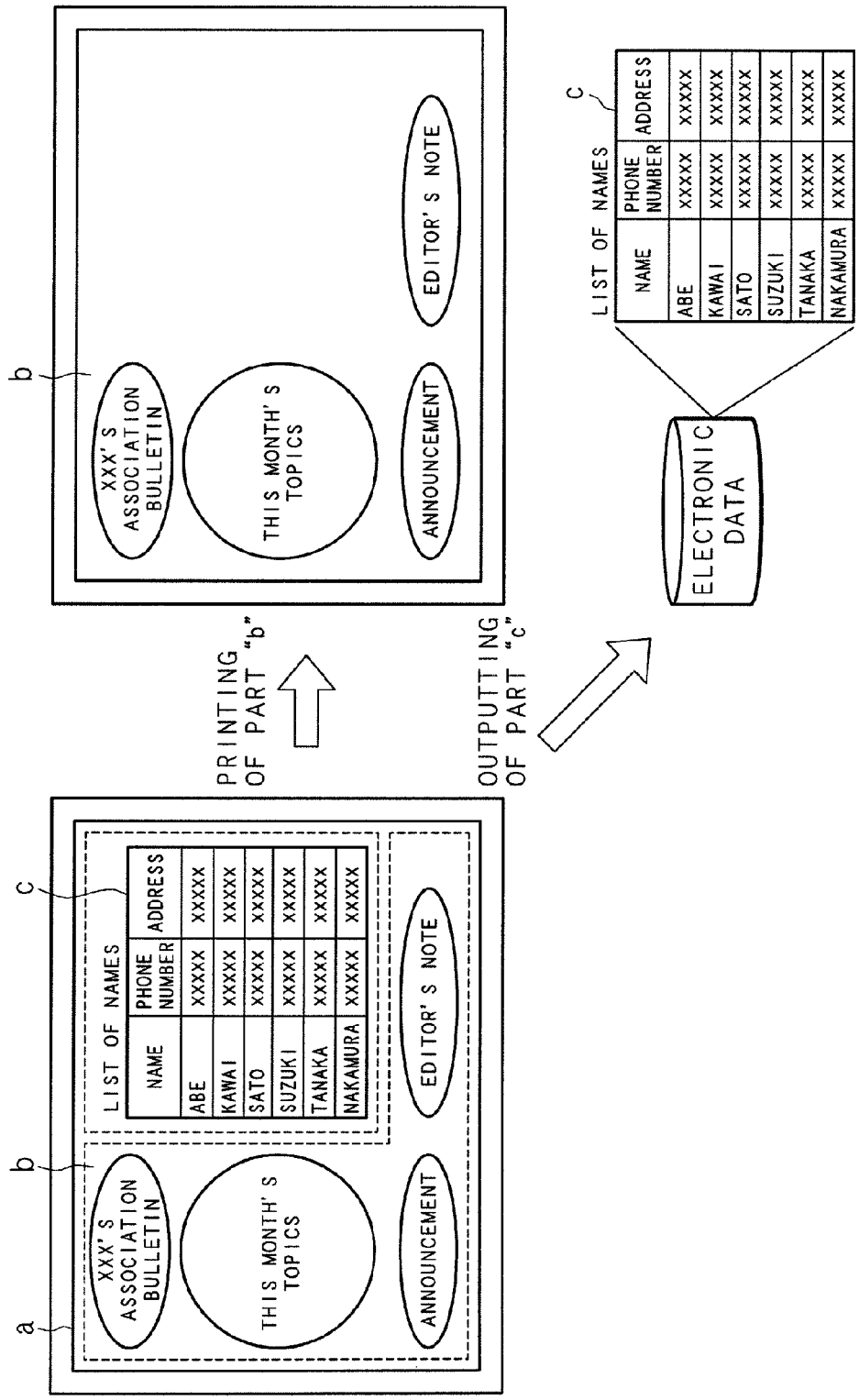
FIG. 10 is a view for illustrating a document "a" of a newspaper or a bulletin prepared for a specified person, a printed part "b" and a part "c" outputted as electronic data.

FIG. 10 is a view for illustrating a document "a" of a newspaper or a bulletin prepared for a specified person, a printed part "b" and a part "c" outputted as electronic data.

A document "a" is provided with:

b. a part, which may be revealed to the general public without problems, including description of information for members or the like and not including description of personal information; and c. a part, which is to be protected, including description of personal information such as a name, a phone number and an address for identifying an individual in a list of names or the like.

In such a case where the list is included in the bulletin or the like, though the document "a" may be revealed to a specified person (member), the personal information may be leaked when the document "a" is leaked to an unspecified person.

When area designation is selected in the above step S2, the CPU 27 accepts designation of the area of the part "c" denoted by broken lines in FIG. 10 by the user through the display-operation input unit 3 (S18). When output of electronic data corresponding to a partial image to an external device is selected in the step S19 and an output method other than normal printing is selected in the step S20, the CPU 27 causes the printing unit 5 to print only the part "b" as illustrated in FIG. 10 and outputs electronic data corresponding to the partial image of the part "c" to an external device such as a mobile phone of a specified person so that only the specified person can view the electronic data. Here, the information can be protected further reliably when the electronic data is passworded.

Example 2

Figure 11:
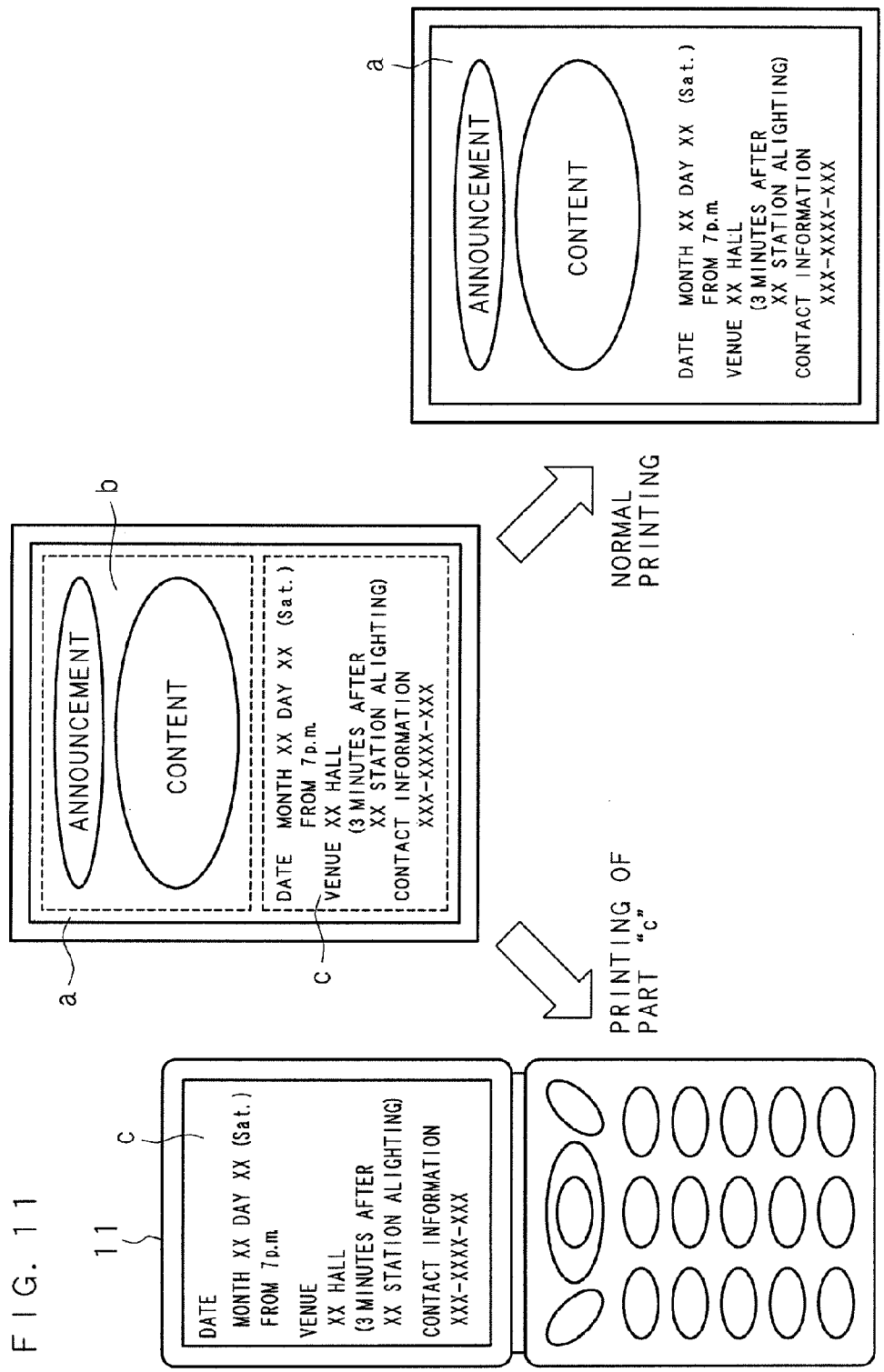
FIG. 11 is a view for illustrating a document "a" of an event announcement, a printed document "a" and a part "c" outputted as electronic data.

FIG. 11 is a view for illustrating a document "a" of an event announcement, a printed document "a" and a part "c" outputted as electronic data.

A document "a" is provided with:

b. a part to explain the content of an event; and c. an important part including a date, a venue, contact information and the like.

Here, assume that the character size of the part "c" is "15 p or larger".

If the user loses a copy of the document "a" of the event announcement or forgets to bring the copy with him on the day of the event, for example, the user may have trouble getting information included in the important part "c".

When character recognition designation is selected in the above step S2 and designation of "a character size equal to or larger than 15 p" is accepted in the step S3, the part "c" is extracted by the character recognizing unit 21, the partial image extracting unit 24 and the display control unit 23 of the control unit 2, and a confirmation screen is displayed at the display-operation input unit 3 (S8, see FIG. 8). When output of electronic data corresponding to a partial image to the mobile phone 11 is selected in the step S19 and normal printing is selected in the step S20, the CPU 27 causes the printing unit 5 to print the document "a" as illustrated in FIG. 11 and a character code and a size code corresponding to a partial image of the part "c" are transmitted to the mobile phone 11 of a specified person so that only the specified person can view the part "c". Here, the information can be protected further reliably when the electronic data is passworded.

Example 3

Figure 12:
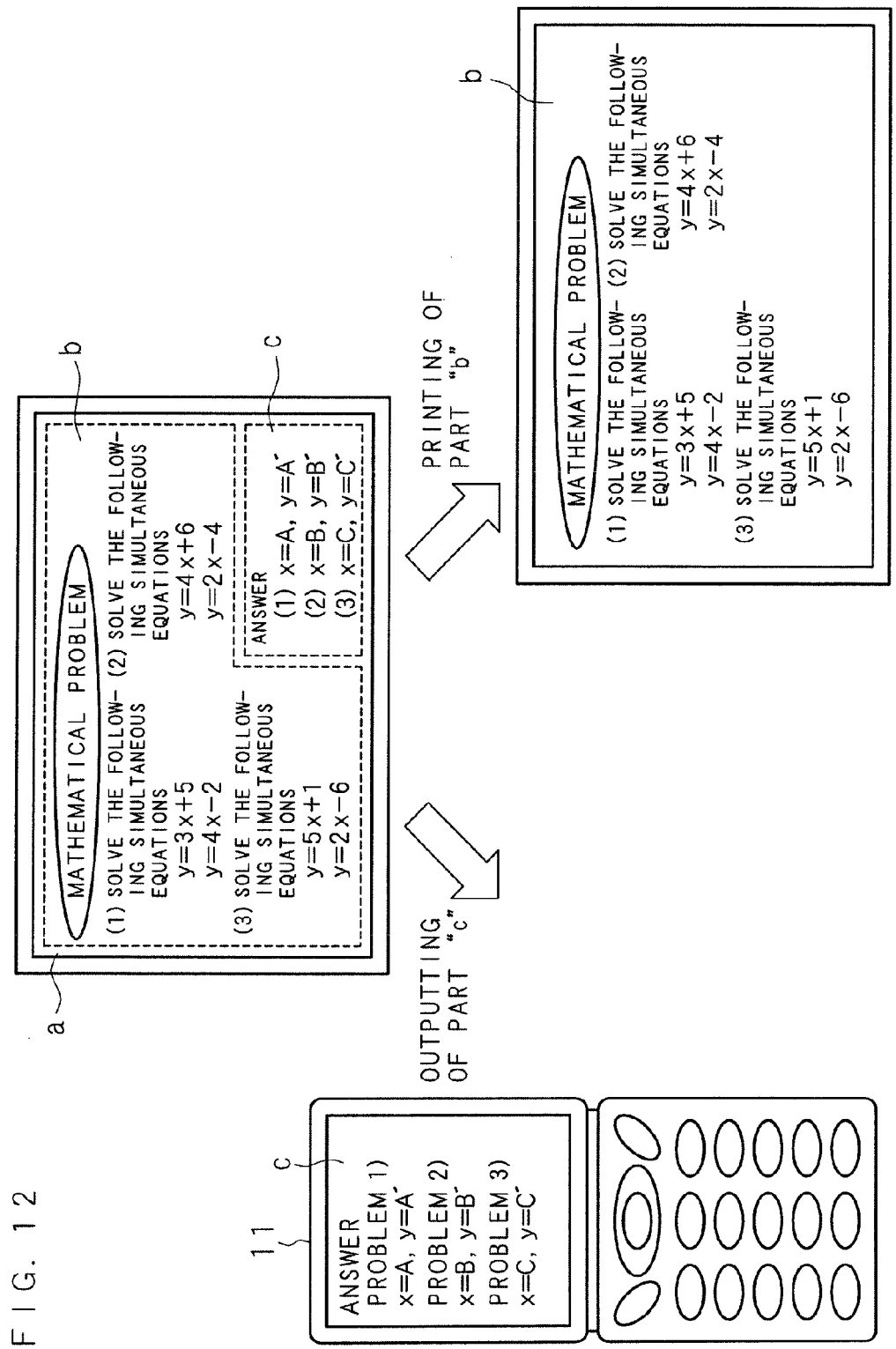
FIG. 12 is a view for illustrating a document "a" of one page of a workbook, a printed part "b" and a part "c" outputted as electronic data.

FIG. 12 is a view for illustrating a document "a" of one page of a workbook, a printed part "b" and a part "c" outputted as electronic data.

A Document "a" is Provided with:

b. a problem part; and c. an answer part.

Here, assume that the part "b" is described in black and the part "c" is described in red.

In such a case where problems and answers are included in one page, there is a problem that the user may see the part "c" against his will while copying the document even though he wants to see the part "c" later.

When character recognition designation is selected in the above step S2 and designation of "red" is accepted as a character color in the step S4, the part "c" is extracted by the character recognizing unit 21, the partial image extracting unit 24 and the display control unit 23 of the control unit 2, and a confirmation screen is displayed at the display-operation input unit 3 (S10). When output of electronic data corresponding to a partial image to the mobile phone 11 is selected in the step S19 and an output method other than normal printing is selected in the step S20, the CPU 27 causes the printing unit 5 to print only the part "b" as illustrated in FIG. 12, and a character code and a color code corresponding to a partial image of the part "c" is transmitted to a designated mobile phone 11 so that the part "c" can be viewed only at the mobile phone 11.

With such a manner, the user can check the answers after solving the problems.

Example 4

Figure 13:
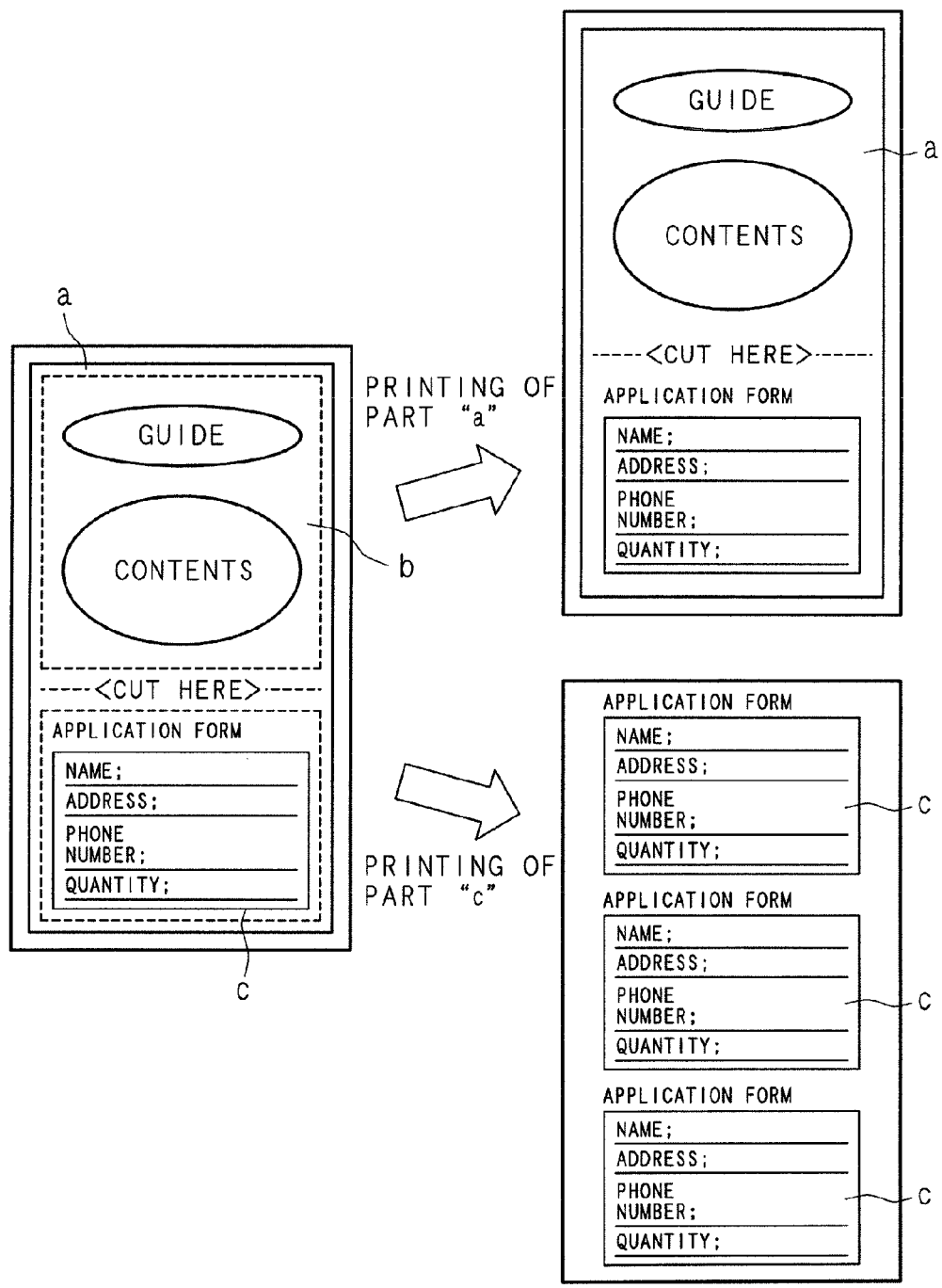
FIG. 13 is a view for illustrating a document "a" of a leaflet of an application guide, a printed document "a" and a printed part "c"

FIG. 13 is a view for illustrating a document "a" of a leaflet of an application guide, a printed document "a" and a printed part "c".

A document "a" is provided with:

b. a part to give a guide and explain the content of an application; and c. an application form part.

Here, assume that the part "c" is described in a "bold character style".

When applications for a plurality of people are to be achieved at a time with a copied document "a", for example, there is a problem that the number of sheets to be used for copying corresponds to the number of people and therefore the number of sheets and the cost are increased.

When character recognition designation is selected in the above step S2 and designation of a "bold character style" is accepted as a character style in the step S5, the part "c" is extracted by the character recognizing unit 21, the partial image extracting unit 24 and the display control unit 23 of the control unit 2, and a confirmation screen is displayed at the display-operation input unit 3 (S12). In addition, a ruled line and a frame border are added by area designation in the step S16. Furthermore, when separate printing of a partial image is selected and "3" is inputted as the number of printing repetitions in the step S19 and normal printing is selected in the step S20, the document "a" is printed by the printing unit 5 and the part "c" is repeatedly printed three times on a sheet different from the document "a" as illustrated in FIG. 13. With such a manner, it is possible to reduce the number of prints.

Example 5

Figure 14:
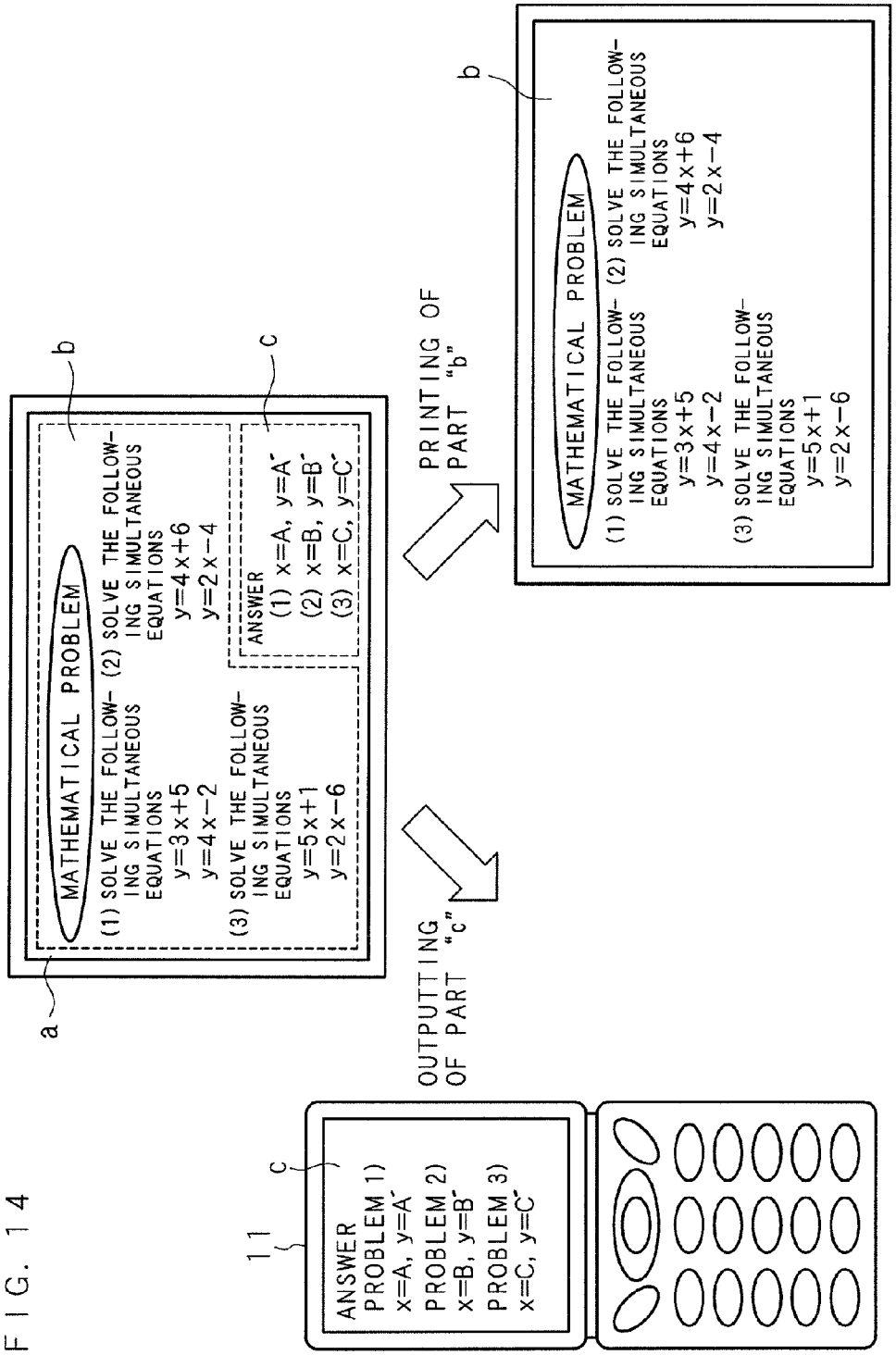
FIG. 14 is a view for illustrating a document "a" of one page of a workbook, a printed part "b" and a part "c" outputted as electronic data.

FIG. 14 is a view for illustrating a document "a" of one page of a workbook, a printed part "b" and a part "c" outputted as electronic data.

As with Example 3, a Document "a" is Provided with:

b. a problem part; and c. an answer part.

Here, assume that both of the part "b" and the part "c" are described in black.

When character recognition designation is selected in the above step S2 and designation of "x=" and "y=" is accepted as character strings in the step S6, the part "c" including "x=" and "y=" is extracted by the character recognizing unit 21, the partial image extracting unit 24 and the display control unit 23 of the control unit 2, and a confirmation screen is displayed at the display-operation input unit 3 (S13). When output of electronic data corresponding to a partial image to the mobile phone 11 is selected in the step S19 and an output method other than normal printing is selected in the step S20, the CPU 27 causes the printing unit 5 to print only the part "b" as illustrated in FIG. 14 and a character code corresponding to a partial image of the part "c" is transmitted to a designated mobile phone 11 so that the part "c" can be viewed only at the mobile phone 11.

In addition, when the digital complex machine 1 of the present embodiment is used for facsimiling a product order sheet or the like, it is also possible to reduce the communications traffic by designating only an order content part of the order sheet as a partial image to reduce the data volume and then transmitting only the order content part, though such a manner is omitted in the figures.

Moreover, data corresponding to a partial image may be transmitted to the server 12 or to the USB memory 14 connected with the digital complex machine 1 and stored therein so that the data can be read out as needed.

It is to be noted that the present invention is not limited to the present embodiment explaining the case where an image processing program for embodying an image processing method of the present invention is stored in the ROM 28 of the control unit 2. A record medium of an image processing program may be a portable record medium, in which a program code (an execute form program, an intermediate code program or a source program) for executing image processing is recorded. In such a case, the digital complex machine 1 is provided with a program reading device or is connected with a program reading device, and a program is read out after inserting the record medium into the program reading device.

A record medium to be used is a record medium for holding a program code fixedly, such as: tape type record media including a magnetic tape and a cassette tape; disk type record media including a magnetic disk such as a flexible disk or a hard disk and an optical disk such as a CD-ROM, an MO, an MD or a DVD; card type record media including an IC card (including a memory card) and an optical memory card; or semiconductor memory type record media including a mask ROM, an EPROM (Erasable Programmable Read Only Memory), an EEPROM (Electrically Erasable Programmable Read Only Memory) and a flash ROM.

Moreover, the program code may be obtained through a communication network.

Moreover, the present invention is not limited to the present embodiment explaining the case where an output method of a partial image is accepted in the step S19 in FIG. 5, and an output method of a partial image may be preset and a partial image may be outputted automatically. However, convenience can be further improved in the case where the user specifies an output method each time depending on the situation.

In addition, the present invention is not limited to the case where the entire image or the rest image of a read image is printed, and the user may select output of the entire image or the rest image to an external device.

Furthermore, the character recognizing unit 21 may be constructed to function as information extracting unit not for executing a process to convert a cut-out character pattern into a character code but for extracting attribute information designated by the user from the character pattern and giving the attribute information to the partial image extracting unit 24 when the designated attribute information is a character size, a character color or a character style. In such a case, not a character code but data corresponding to a partial image is outputted to an external device.

Moreover, the character recognizing unit 21 may be constructed not to give extracted attribute information to the partial image extracting unit 24 but to execute processes up to a process to extract a partial image including a highlighted character having extracted attribute information on the basis of the attribute information.

In addition, the control unit 2 may be provided with a specific color extracting unit for extracting a character color designated by the user.

The present invention is not limited to the content of the embodiment described above, and various changes within the range shown in the claims are possible. That is, the embodiment obtained by combining technical means changed properly within the range shown in the claims is included in the technical scope of the present invention.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image processing device for processing a read image and outputting data based on the read and processed image, by any one of output methods including printing and transmission to an external device under control of a control unit, comprising:

a partial image extracting unit for extracting data corresponding to a partial image of said read image on the basis of a designated area; a designated attribute information including a character size, a character color or a character style; or a designated character string;

a displaying unit for displaying the extracted partial image;

a judging unit for judging whether said partial image has been extracted correctly or not on the basis of the displayed partial image; and a correcting unit for correcting said partial image according to a designated area, when judging said partial image has not been extracted correctly, wherein said control unit outputs the data corresponding to said partial image by any one of the output methods when judging said partial image has been extracted correctly, or after correcting said partial image by said correcting unit.

2. The image processing device according to claim 1, further comprising:

an operation input unit for accepting selection of an output method of the data corresponding to said partial image.

3. The image processing device according to claim 1, wherein said control unit causes printing based on data corresponding to a remainder of said read image.

4. The image processing device according to claim 2, wherein said control unit causes printing based on data corresponding to a remainder of said read image.

5. The image processing device according to claim 2, wherein said operation input unit accepts an instruction for printing a plurality of copies of said partial image on one print sheet on the basis of the data corresponding to said partial image; and said control unit causes printing of a plurality of copies of said partial image on the print sheet when accepting said instruction by said operation input unit.

6. The image processing device according to claim 2, wherein said operation input unit accepts designation of an area; and said partial image extracting unit extracts data corresponding to said partial image on the basis of the accepted area.

7. The image processing device according to claim 4, wherein said operation input unit accepts designation of an area; and said partial image extracting unit extracts data corresponding to said partial image on the basis of the accepted area.

8. The image processing device according to claim 2, wherein said operation input unit accepts designation of attribute information including the character size, the character color or the character style;

the image processing device further including, a character recognizing unit for extracting the designated attribute information on the basis of a character pattern cut out from said read image; and giving said attribute information to said partial image extracting unit, wherein said partial image extracting unit extracts data corresponding to the partial image including a character having said attribute information given from said character recognizing unit.

9. The image processing device according to claim 4, wherein said operation input unit accepts designation of attribute information including the character size, the character color or the character style;

the image processing device, further including, a character recognizing unit for extracting the designated attribute information on the basis of a character pattern cut out from said read image; and giving said attribute information to said partial image extracting unit, wherein said partial image extracting unit extracts data corresponding to the partial image including a character having said attribute information given from said character recognizing unit.

10. The image processing device according to claim 2, wherein said operation input unit accepts designation of the character string;

the image processing device further including, a character recognizing unit for extracting feature information for character recognition on the basis of a character pattern cut out from said read image, converting said feature information into a character code and giving the character code to said partial image extracting unit, wherein said partial image extracting unit extracts data corresponding to the partial image of a part where character codes corresponding to the character string line up, on the basis of said character code given from said character recognizing unit.

11. The image processing device according to claim 4, wherein said operation input unit accepts designation of the character string;

the image processing device further including, a character recognizing unit for extracting feature information for character recognition on the basis of a character pattern cut out from said read image, converting said feature information into a character code and giving the character code to said partial image extracting unit, wherein said partial image extracting unit extracts data corresponding to the partial image of a part where character codes corresponding to the character string line up, on the basis of said character code given from said character recognizing unit.

12. An image processing method for processing a read image and outputting data based on the read and processed image, by any one of output methods including printing and transmission to an external device, comprising:

a first step of extracting data corresponding to a partial image of said read image on the basis of a designated area; a designated attribute information including a character size, a character color or a character style; or a designated character string; and a second step of displaying the extracted partial image;

a third step of judging whether said partial image has been extracted correctly or not on the basis of the displayed partial image;

a fourth step of correcting said partial image when judging said partial image has not been extracted correctly and outputting the data corresponding to said partial image by any one of the output methods; or outputting the data corresponding to said partial image by any one of the output methods when judging said partial image has been extracted correctly.

* * * * *